(12) United States Patent
Saripalli

(10) Patent No.: US 8,250,254 B2
(45) Date of Patent: Aug. 21, 2012

(54) OFFLOADING INPUT/OUTPUT (I/O) VIRTUALIZATION OPERATIONS TO A PROCESSOR

(75) Inventor: Ramakrishna Saripalli, Cornelius, OR (US)

(73) Assignee: Intel Corporation, Santa Clara, CA (US)

( * ) Notice: Subject to any disclaimer, the term of this patent is extended or adjusted under 35 U.S.C. 154(b) by 245 days.

(21) Appl. No.: 11/888,029

(22) Filed: Jul. 31, 2007

(65) Prior Publication Data

US 2009/0037614 A1    Feb. 5, 2009

(51) Int. Cl.
*G06F 13/28* (2006.01)

(52) U.S. Cl. .................. 710/30; 710/22; 710/26

(58) Field of Classification Search .............. 710/30, 710/62, 22, 26; 711/207, 203, 202; 714/42
See application file for complete search history.

(56) References Cited

U.S. PATENT DOCUMENTS

| | | | |
|---|---|---|---|
| 6,009,488 A | 12/1999 | Kavipurapu | 710/105 |
| 6,976,117 B2 * | 12/2005 | Clark et al. | 711/3 |
| 7,316,021 B2 * | 1/2008 | Joy et al. | 718/108 |
| 7,487,327 B1 * | 2/2009 | Chang et al. | 711/203 |
| 7,496,713 B1 * | 2/2009 | Ward et al. | 711/141 |
| 7,548,999 B2 * | 6/2009 | Haertel et al. | 710/62 |
| 7,739,474 B2 * | 6/2010 | Engbersen et al. | 711/203 |
| 2002/0040451 A1 * | 4/2002 | Harris et al. | 714/42 |
| 2002/0069341 A1 * | 6/2002 | Chauvel et al. | 711/207 |
| 2003/0033510 A1 * | 2/2003 | Dice | 712/235 |
| 2005/0177701 A1 * | 8/2005 | O'Connor | 711/206 |
| 2005/0204099 A1 * | 9/2005 | Morrow | 711/143 |
| 2006/0236070 A1 * | 10/2006 | Wang et al. | 711/203 |
| 2006/0251120 A1 | 11/2006 | Arimilli et al. | |
| 2006/0288130 A1 | 12/2006 | Madukkarumukumana et al. | |
| 2007/0168636 A1 | 7/2007 | Hummel et al. | |
| 2007/0168641 A1 | 7/2007 | Hummel et al. | |
| 2007/0168643 A1 | 7/2007 | Hummel et al. | |
| 2007/0168644 A1 * | 7/2007 | Hummel et al. | 711/207 |
| 2007/0226450 A1 * | 9/2007 | Engbersen et al. | 711/203 |
| 2008/0147925 A1 * | 6/2008 | Brahmaroutu | 710/62 |

FOREIGN PATENT DOCUMENTS

| | | |
|---|---|---|
| JP | 63-056747 | 3/1988 |
| JP | H04-308953 | 10/1992 |
| JP | 2004-038808 | 2/2004 |
| TW | I230863 | 4/2005 |

OTHER PUBLICATIONS

Korean Patent Office, International Search Report and Written Opinion for International Application No. PCT/US2008/071573, 10 pgs., Jan. 30, 2009.
U.S. Appl. No. 11/541,713, filed Sep. 29, 2006, entitled "Methods for Pushing Address Translations Mappings to PCI Express Endpoints," by Ramakrishna Saripalli.

(Continued)

*Primary Examiner* — Ernest Unelus
(74) *Attorney, Agent, or Firm* — Trop, Pruner & Hu, P.C.

(57) ABSTRACT

In one embodiment, the present invention includes a method for receiving a request for a direct memory access (DMA) operation in an input/output (I/O) hub, where the request includes a device virtual address (DVA) associated with the DMA operation, determining in the I/O hub whether to perform an address translation to translate the DVA into a physical address (PA), and sending the request with the DVA from the I/O hub to a processor coupled to the I/O hub if the I/O hub determines not to perform the address translation. Other embodiments are described and claimed.

19 Claims, 4 Drawing Sheets

OTHER PUBLICATIONS

U.S. Appl. No. 11/602,715, filed Nov. 21, 2006, entitled "Improving Address Translation Performance in Virtualized Environments," by Ramakrishna Saripalli.

Darren Abramson, et al., "Intel® Virtualization Technology for Directed I/O" Aug. 10, 2006, pp. 178-193.

The State Intellectual Property Office of the People's Republic of China, Notice on the Second Office Action issued Jun. 30, 2010 in Chinese patent application No. 200810144272.2.

Japanese Patent Office, Office Action mailed Sep. 21, 2010 in Japanese patent application No. 2008-182479.

Chinese Patent Office, Decision on Rejection mailed Apr. 27, 2011 in Chinese application No. 200810144274.2.

German Patent and Trademark Office, Office Action issued on Oct. 14, 2010 in German patent application No. 11 2008 002 019.1-53.

R.O.C. Taiwanese Patent Office, Office Action mailed Mar. 29, 2012 in Taiwanese application No. 97126344.

* cited by examiner

OFFLOADING INPUT/OUTPUT (I/O) VIRTUALIZATION OPERATIONS TO A PROCESSOR

BACKGROUND

Computer systems have internal communication systems to transfer data. These internal communication systems include a set of interconnects. The interconnects provide data communication between the components of the system. However, these interconnects can also be bottlenecks for system performance if they are not able to keep up with the demands of the components of the system.

Peripheral components coupled to a system such as by way of an input/output controller or other such hub often make direct memory access (DMA) requests. DMA requests are used to access areas of main memory to retrieve or write data. Peripheral components typically have a virtual address range assigned by an operating system that they are allowed to access. The peripheral components request and retrieve mapping data that allows them to determine the physical addresses, corresponding to the virtual addresses used by the component, of the memory location for a DMA transaction. However, the requests for translation data can create excessive traffic over system interconnects.

DETAILED DESCRIPTION

In various embodiments, bandwidth needed to handle address translation operations and memory access latencies may be reduced. To effect such reductions in bandwidth and memory latency, embodiments may provide extended address translation mechanisms within a processor of a system. More specifically, a processor node including one or more processor cores, memory management units (MMUs) such as translation lookaside buffers (TLBs), among other resources, may further be provided with an additional address translation mechanism such as a so-called virtualization engine to perform offloaded address translations on behalf of input/output (I/O) devices coupled to the platform.

Figure 1:
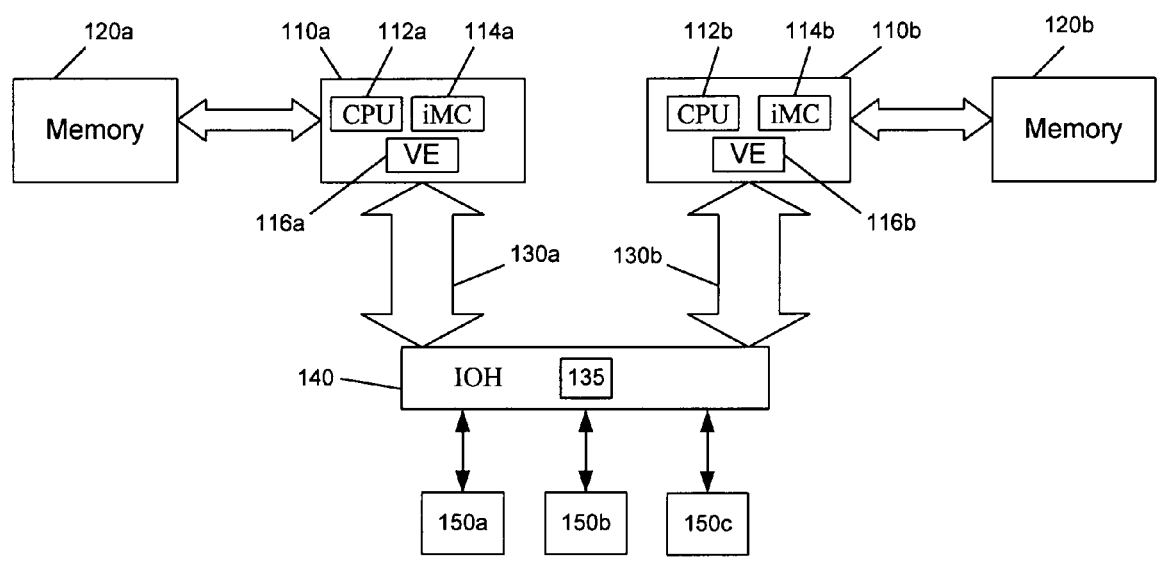
FIG. 1 is a block diagram of a system in accordance with one embodiment of the present invention.

Referring now to FIG. 1, shown is a block diagram of a system in accordance with one embodiment of the present invention. As shown in FIG. 1, system 100 includes a plurality of processing nodes, namely a first processor 110a and a second processor 110b (generically processor 110). Processor 110a, which may be a central processing unit (CPU) may include a CPU core 112a, an integrated memory controller 114a and a virtualization engine 116a. Similarly, processor 110b may include a core 112b, an integrated memory controller 114b, and a virtualization engine 116b.

Referring still to FIG. 1, each processor 110 may be coupled to a portion of main memory locally attached thereto. Specifically, processor 110a may be coupled to memory 120a, while processor 110b is coupled to memory 120b. In one embodiment, memory 120 (generically) may be dynamic random access memory (DRAM), although the scope of the present invention is not limited in this regard.

As further shown in FIG. 1, processors 110 may be coupled by interconnects 130a and 130b, which may be point-to-point (P-P) interconnects, to an input output (I/O) hub 140. I/O hub 140 may include a virtualization engine 135. As shown in the embodiment of FIG. 1, I/O hub 140 may be coupled to various I/O devices 150a-150c. While shown with this particular implementation in FIG. 1, the scope of the present invention is not so limited.

Because each processor has its own virtualization engine, offloading of translation capacity from the I/O hub may be realized. By offloading translation and memory access requirements to such virtualization engines in the processors, a corresponding virtualization engine in the I/O hub may be freed up to provide for greater capacity. Furthermore, by offloading translation access functionality (on a per-mapping and access request basis) to the processor that is running a virtual machine that owns the I/O device associated with a request (i.e., a VM assigned direct device I/O) device DMA performance can be enhanced. As such, each processor socket may provide a virtualization engine to store virtualization page table entries for physical addresses that are mapped to local memory of the corresponding processor.

Accordingly, using various embodiments when a cache miss occurs to a virtualization engine in the I/O hub, the corresponding request may simply be offloaded from the device with all transaction details (e.g., a device virtual address (DVA), length and so forth) to the processor(s) that own the physical memory ranges to which the DVA range maps. By processing DMA transactions from a device in a processor closely coupled with the corresponding memory, performance improvements may be realized in cases where a VM has an affinity mask with such processor and the VM owns the device (i.e., a direct device assigned I/O).

Before an I/O device can use a virtualization engine of a processor, a sequence of actions may be performed to enable such operation. Specifically, an initiation process may be performed to set up a region of physical memory for DMA purposes and to register it with an operating system (OS) for device access.

Figure 2:
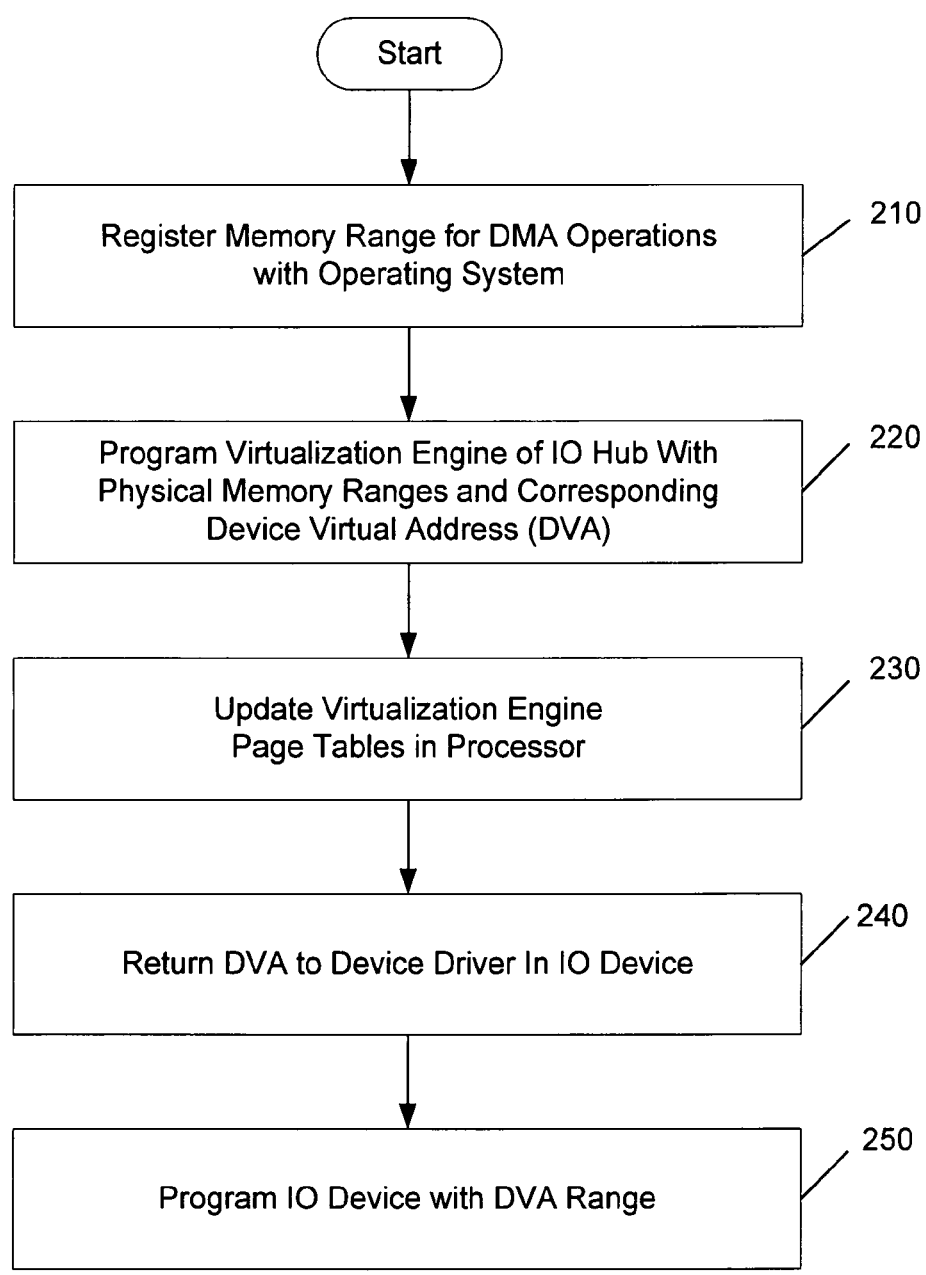
FIG. 2 is a flow diagram of a method in accordance with one embodiment of the present invention.

Referring now to FIG. 2, shown is a flow diagram of a method in accordance with one embodiment of the present invention. As shown in FIG. 2, method 200 may begin when a device such as an I/O device desires to perform DMA operations. As shown FIG. 2, a memory range for DMA operations may be registered with the OS (block 210). In one embodiment, a device driver (e.g., running as part of a VM or on a native OS) allocates a range of memory for DMA purposes and registers it with the OS for device access. Still referring to FIG. 2, next a virtualization engine of the I/O hub may be programmed with physical memory ranges and corresponding device virtual addresses (DVAs) (block 220). For example, the OS may program the virtualization engine with the physical memory ranges of the associated main memory and obtain a device virtual address. In connection with this operation, VE page tables may be updated in the associated CPU (block 230). For example, a VE in the CPU may snoop on these transactions and update its own page table entries with the corresponding physical addresses and DVAs. Alternately, the virtualization engine in the I/O hub may decode an identifier such as a node identifier (node ID) in the physical address range that points to the CPU that owns the ranges and send a corresponding message to the VE in the CPU to update its page tables accordingly. Thus at this point time there are two copies of the page table entries for the same DVA.

Referring still to FIG. 2, next a DVA may be returned to the device driver in the I/O device (block 240). Accordingly, the I/O device may be programmed with the DVA range (block 250). For example, the device driver may program its device with the DVA ranges, e.g., using a device-to-driver private channel for such programming. While showing this particular implementation in the embodiment of FIG. 2, understand the scope of the present invention is not limited in this regard.

Figure 3:
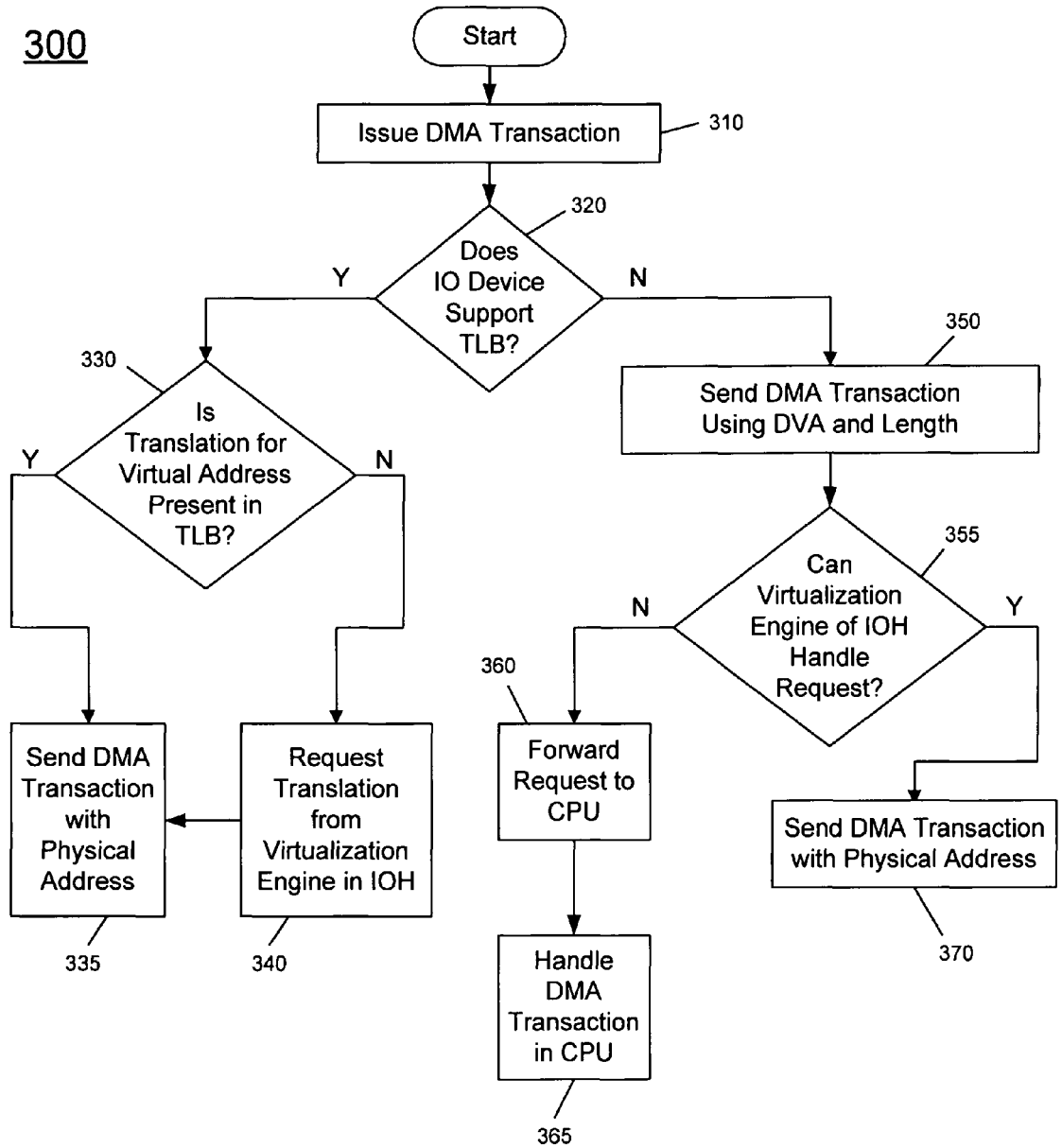
FIG. 3 is a flow diagram of a method in accordance with another embodiment of the present invention.

After device initialization has been performed in accordance with an embodiment of the present invention, DMA operations between an I/O device and a desired location, such as a portion of main memory, may be performed. Referring now to FIG. 3, shown is a flow diagram of a method in accordance with one embodiment of the present invention. Method 300 may be used to perform DMA transactions, and may begin by issuing a DMA transaction (block 310). For example, an I/O device may issue a DMA transaction to read data from memory or write data directly to memory. Control passes from block 310 to diamond 320, where it may be determined whether the I/O device supports a TLB or other memory management unit (MMU). If so, control passes to diamond 330, where it may be determined whether a translation from a virtual address to a physical address is present in the TLB or other such structure (diamond 330). If so, the DMA transaction may be sent from the I/O device with the corresponding physical address (block 335). Accordingly, this physical address may be passed through the I/O hub and a corresponding CPU to the desired memory location to perform the DMA transaction.

If instead at diamond 330, it is determined that the translation is not present in the TLB, a request for a translation from a VE may be made (block 340). The I/O hub may provide the corresponding translated physical address to the TLB or other MMU structure of the I/O device so that the I/O device then sends the DMA transaction with the PA (also block 335). Note that translation information may also be provided from the VE of the I/O hub to the VE in the CPU to enable the VE to update its entries, e.g., page table entries.

While not shown in FIG. 3 for ease of illustration, note that if the translation is not present in the VE of the I/O hub, the corresponding page tables may be read from memory, and page tables of (potentially) the VEs of both the processor and the I/O hub may be updated. Still further, the I/O hub may forward such page tables to the I/O device to update its TLB or other MMU structure. In yet other implementations, if the translation is missing in the I/O hub's VE, the I/O hub may simply pass on the DMA transaction to the processor for handling in the processor's VE, as discussed below with regard to blocks 360 and 365.

Referring back to FIG. 3, if instead at diamond 320 it is determined that the I/O device does not support a TLB, control passes to block 350. There, a DMA transaction may be sent from the I/O device to the I/O hub using a DVA and length, for example, as information to enable execution of the DMA operation. Next, at diamond 355 it may be determined whether the VE in the I/O hub can handle the request. While the scope of the present invention is not limited in this regard, this decision may be made based on a number of factors including, for example, whether the translation is already present in its VE page tables, its cache miss ratio, the load it is currently handling, the load on a P-P interconnect (e.g., the load is below a threshold bandwidth), and so forth.

If it is determined at diamond 355 that the I/O hub's VE cannot handle the request, the request is forwarded to the CPU (block 360). For example, in some embodiments a page fault may be made to pass this transaction from the I/O hub to the CPU that owns the associated memory ranges along a P-P interconnect. In some embodiments, the I/O hub may translate the incoming DMA transaction from a first protocol in which the I/O device and the I/O hub communicate to a second protocol with which the I/O hub and the processor communicate. In one particular implementation, the first communication protocol may be in accordance with a peripheral component interconnect (PCI) protocol such as a PCI Express™ protocol in accordance with the PCI Express™ Specification Base Specification version 2.0 (published Dec. 20, 2006), while the second communication protocol may be in accordance with a common system interface (CSI) communication protocol (described below), although the scope of the present invention is not limited in this regard. Accordingly, at block 365, the CPU may handle the DMA transaction. For example, the VE in the CPU may have a translation present and provide the translation along with the DMA request to enable commitment of the request and then to pass the request along to the main memory for processing. In so doing the need for multiple transactions between CPU and I/O hub may be avoided, as responses, completions and other such transactions need not occur. Note that if instead the CPU VE does not include the translation, a page walk mechanism may be performed to receive such translation information, e.g., from main memory and load it into the VE of the CPU, and to then perform the DMA transaction.

If instead at diamond 355 it is determined that the VE in the I/O hub can handle the request, control passes to block 370, where the translation may be performed and the DMA transaction sent with the corresponding physical address along the P-P interconnect to the CPU. Note that in other implementations, if the translation is not present in the I/O hub's VE, the translation may be requested from the CPU. When the translation information is received, the VE of the I/O hub may be updated accordingly. While shown with this particular implementation in the embodiment of FIG. 3, the scope of the present invention is not limited in this regard.

By performing address translations in a VE of the processor, reduced communications on the P-P interconnect may be realized. For example, in an embodiment implementing a CSI protocol, which is a cache coherent protocol to enable communication of both coherent and non-coherent transactions through a system along a set of P-P interconnects, reduced communications between processor and I/O hub may be realized. Specifically, if the address translation from DVA to PA were to be performed in the I/O hub and the translation is missing in a VE of the I/O hub, a number of transactions would need to occur along the P-P interconnect to request updated page table information from a memory and to provide this information back to the VE of the I/O hub. For example, the I/O hub would need to read the page tables from the memory of the processor that owns the range of DVAs, which would be performed by issuing a coherent read request and receiving response packets. Depending on a number of page walks needed, the page table read may involve multiple coherent read requests and response packets. For example, in one implementation four memory transactions and four completions may need to be performed, causing eight transactions along the P-P interconnect. Instead, using an embodiment such as described above in FIG. 3, a single transaction may be sent to pass the DMA transaction from the I/O hub to the processor for execution. Thus these eight transactions may be avoided, along with the additional transactions to commit the actual DMA request to memory, which may involve further coherent transactions. Thus using embodiments of the present invention, the virtualization engine in the I/O hub can convert the DMA transaction from a first protocol to a second protocol and forward it to the processor to enable the virtualization engine in the processor to perform all lookups and commit transactions to its local memory, avoiding transactions on the P-P interconnect.

Figure 4:
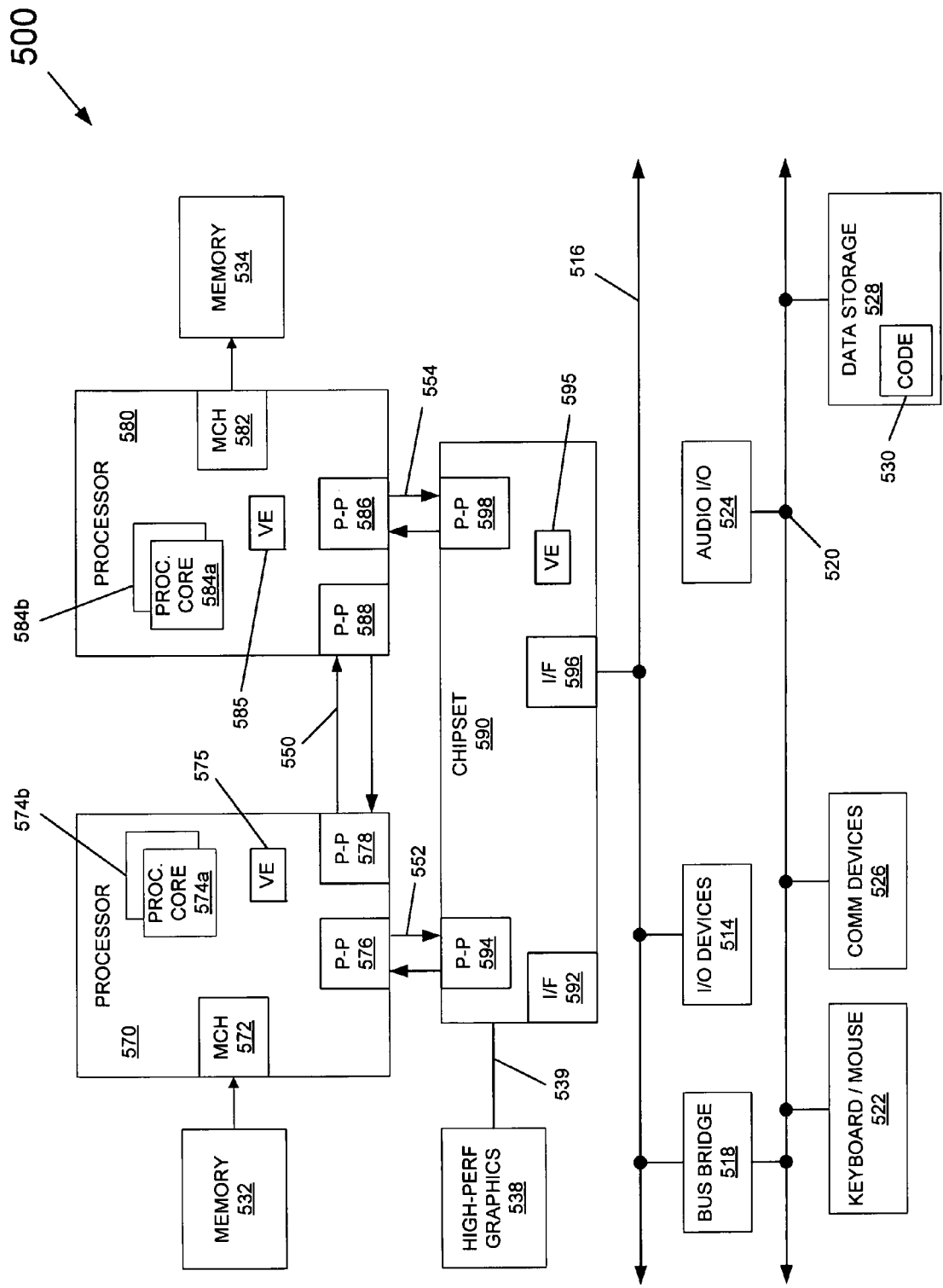
FIG. 4 is a block diagram of a point-to-point interconnect system in accordance with one embodiment of the present invention.

Embodiments may be suited for many different platform types to reduce traffic between an I/O hub and processor node along a P-P interconnect. As shown in FIG. 4, multiprocessor system 500 is a point-to-point interconnect system, and includes a first processor 570 and a second processor 580 coupled via a point-to-point (P-P) interconnect 550, although the system may be of another bus architecture. As shown in FIG. 4, each of processors 570 and 580 may be multi-core processors including first and second processor cores (i.e., processor cores 574a and 574b and processor cores 584a and 584b), although other cores may be present. Furthermore, as shown in FIG. 4 first and second processors 570 and 580 each include a virtualization engine 575 and 585 in accordance with an embodiment of the present invention. Still referring to FIG. 4, first processor 570 further includes a memory controller hub (MCH) 572 and P-P interfaces 576 and 578. Similarly, second processor 580 includes a MCH 582 and P-P interfaces 586 and 588. As shown in FIG. 4, MCH's 572 and 582 couple the processors to respective memories, namely a memory 532 and a memory 534, which may be portions of main memory (e.g., dynamic random access memory (DRAM) or fully buffered dual in-line memory modules (FB-DIMM)).

First processor 570 and second processor 580 may be coupled to a chipset 590 via P-P interconnects 552 and 554, respectively. As shown in FIG. 4, chipset 590 includes P-P interfaces 594 and 598. Furthermore, chipset 590 includes an interface 592 to couple chipset 590 with a high performance graphics engine 538. In one embodiment, an Advanced Graphics Port (AGP) bus 539 or a point-to-point interconnect may be used to couple graphics engine 538 to chipset 590. Chipset 590 further includes a VE 595 to perform address translations, and furthermore to determine whether to pass a transaction from a downstream device, such as a DMA transaction along to a selected one of first and second processors 570 and 580, with an untranslated DVA to enable reduced bandwidth along the corresponding P-P interconnect 552. As shown in FIG. 4, various I/O devices 514 may be coupled to first bus 516, along with a bus bridge 518 which couples first bus 516 to a second bus 520. Various devices may be coupled to second bus 520 including, for example, a keyboard/mouse 522, communication devices 526 and a data storage unit 528 which may include code 530, in one embodiment. Further, an audio I/O 524 may be coupled to second bus 520.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
receiving a request for a direct memory access (DMA) operation in an input/output (I/O) hub from an I/O device coupled to the I/O hub, the request including a device virtual address (DVA) associated with the DMA operation;
determining in the I/O hub whether to perform an address translation to translate the DVA into a physical address (PA) in a first translation engine of the I/O hub configured to receive and perform DVA to PA translations;
sending the request with the DVA from the I/O hub to a processor coupled to the I/O hub when the I/O hub determines not to perform the address translation on a per mapping and access request basis, and performing the address translation in a second translation engine of the processor configured to receive and perform DVA to PA translations; and
receiving a second request for a second DMA operation in the I/O hub from the I/O device, the second request including a second DVA associated with the second DMA operation, translating the second DVA into a second PA in the first translation engine, and sending the request with the second PA from the I/O hub to the processor.

2. The method of claim 1, further comprising determining whether to perform the address translation in the I/O hub based on a bandwidth of an interconnect between the I/O hub and the processor.

3. The method of claim 1, wherein the second translation engine includes a buffer to store DVA to PA translations, the buffer separate from a translation lookaside buffer of the processor.

4. The method of claim 1, further comprising performing the address translation in the I/O device if the I/O device includes a hardware translation mechanism, otherwise sending the request with the DVA from the I/O device to the I/O hub.

5. The method of claim 1, further comprising sending the request from the I/O hub to the processor, wherein the processor is associated with a portion of memory corresponding to the PA, based on a node identifier of the request, wherein the node identifier corresponds to the processor.

6. The method of claim 1, further comprising reducing bandwidth on a point-to-point interconnect between the I/O hub and the processor by sending the request with the DVA from the I/O hub to the processor, wherein address translation information corresponding to the DVA is not sent from the processor to the I/O hub to thereby reduce the bandwidth.

7. An apparatus comprising:
a processor including:
at least one core to execute operations on data;
a cache memory including a translation lookaside buffer;
a memory controller to handle memory transactions with a portion of a system memory coupled to the processor; and
a translation engine to receive a direct memory access (DMA) operation including a device virtual address (DVA), and to translate the DVA to a physical address (PA) corresponding to a location in the portion of the system memory, wherein the translation engine is configured to snoop signals associated with programming a second translation engine in an input/output (I/O) hub coupled to the processor, the programming to store DVA to PA translations in the second translation engine, the second translation engine configured to perform DVA to PA translations.

8. The apparatus of claim 7, wherein an I/O device coupled to the processor is a direct I/O device for a virtual machine.

9. The apparatus of claim 7, wherein the translation engine is to snoop updates from the second translation engine and to update the translation engine based on the updates.

10. The apparatus of claim 9, wherein the I/O hub is to send the DMA operation to the processor with the DVA, to reduce bandwidth on an interconnect that couples the I/O hub and the processor.

11. The apparatus of claim 10, wherein the second translation engine is to perform the DVA to PA translations if the bandwidth on the interconnect is below a threshold amount.

12. A system comprising:
a first processor including at least one core to execute operations on data, a cache memory including a translation lookaside buffer, and a first translation engine configured to perform offloaded address translations for an input/output (I/0) device coupled to the first processor and receive a request for a direct memory access (DMA) operation including a device virtual address (DVA), to translate the DVA to a physical address (PA) located in a first portion of memory coupled to the first processor, and to forward the DMA operation to the first portion of memory;
a second processor including at least one second core to execute operations on data, a second cache memory including a second translation lookaside buffer, and a second translation engine configured to perform offloaded address translations for the I/O device and receive a DMA operation including a DVA, to translate the DVA to a PA located in a second portion of memory coupled to the second processor, and to forward the DMA operation to the second portion of memory; and
a hub coupled between the I/O device and the first and second processors, the hub including a hub translation engine configured to receive and perform DVA to PA translations, direct the DMA operation to the first processor or the second processor based on the DVA, and determine, based at least in part on a load of the hub translation engine, whether to perform an address translation to translate the DVA into the PA in the hub translation engine or to send the request with the DVA to the directed first or second processor if the hub determines not to perform the address translation so that the directed first or second processor performs the address translation.

13. The system of claim 12, wherein the hub is to further determine whether to perform the address translation in the hub based on a bandwidth of an interconnect between the hub and the first processor.

14. The system of claim 12, wherein the first translation engine is to snoop signals associated with a programming of a DVA range for the I/O device and to update entries in a buffer of the first translation engine based on the snoop signals.

15. The system of claim 12, wherein the first translation engine and the hub translation engine each includes a first set of DVA to PA translations corresponding to locations in the first portion of memory coupled to the first processor.

16. The system of claim 15, wherein first translation engine is to prevent a plurality of memory transactions on an interconnect between the first processor and the hub when the DVA to PA translation for the DMA operation is not present in the first set of DVA to PA translations.

17. The system of claim 16, wherein the hub is to translate the DMA operation request from a first protocol in which the hub and the I/O device communicate to a second protocol in which the hub and the first processor communicate, but not translate the DVA to the PA.

18. The system of claim 15, wherein the I/O device further includes a memory management unit (MMU) to store the first set of DVA to PA translations, wherein the I/O device is to transmit a second DMA operation with a PA when a DVA to PA translation for the second DMA operation is present in the MMU.

19. The method of claim 1, further comprising determining whether to perform the address translation in the first translation engine of the I/O hub based on a load of the I/O hub.

* * * * *